United States Patent
Jung et al.

(10) Patent No.: US 9,913,222 B2
(45) Date of Patent: *Mar. 6, 2018

(54) METHOD AND APPARATUS FOR UPLINK POWER CONTROL IN COMMUNICATION SYSTEM

(71) Applicant: Samsung Electronics Co., Ltd., Gyeonggi-do (KR)

(72) Inventors: Jin-Kwan Jung, Seoul (KR); Hee-Kwun Cho, Incheon (KR); In-Seok Hwang, Seoul (KR); Dong-Oh Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 121 days.

This patent is subject to a terminal disclaimer.

(21) Appl. No.: 13/938,863

(22) Filed: Jul. 10, 2013

(65) Prior Publication Data
US 2013/0301573 A1 Nov. 14, 2013

Related U.S. Application Data

(63) Continuation of application No. 13/315,950, filed on Dec. 9, 2011, now Pat. No. 8,509,840, which is a (Continued)

(30) Foreign Application Priority Data

Aug. 24, 2006 (KR) ........................ 10-2006-0080799

(51) Int. Cl.
*H04W 52/20* (2009.01)
*H04W 52/14* (2009.01)
*H04W 52/28* (2009.01)

(52) U.S. Cl.
CPC ......... *H04W 52/20* (2013.01); *H04W 52/146* (2013.01); *H04W 52/286* (2013.01)

(58) Field of Classification Search
CPC .. H04W 52/20; H04W 52/286; H04W 52/146
See application file for complete search history.

(56) References Cited

U.S. PATENT DOCUMENTS 7,177,369 B2 2/2007 Crilly, Jr.
7,761,112 B2 7/2010 Lee et al.
(Continued)

FOREIGN PATENT DOCUMENTS

CN 1653830 8/2005
CN 1777084 5/2006
(Continued)

OTHER PUBLICATIONS

Gang Wu et al., " A Mixed CHannel Access and Hybrid ARQ Method for Wireless Communication Networks", p. 707-712, Nov. 6-10, 1995.
(Continued)

*Primary Examiner* — Anh-Vu Ly
*Assistant Examiner* — Hector Reyes Ortiz
(74) *Attorney, Agent, or Firm* — The Farrell Law Firm, P.C.

(57) ABSTRACT

Disclosed is a method for uplink power control in a communication system that includes determining a power control offset for controlling power for traffic to be transmitted by a subscriber station, according to whether a Hybrid Automatic Repeat reQuest (HARQ) is applied to the traffic, and transmitting the power control offset to the subscriber station.

20 Claims, 4 Drawing Sheets

Related U.S. Application Data continuation of application No. 11/844,616, filed on Aug. 24, 2007, now Pat. No. 8,095,165.

(56) References Cited

U.S. PATENT DOCUMENTS

| | | | |
|---|---|---|---|
| 7,907,570 B2 | 3/2011 | Hwang | |
| 8,095,165 B2 | 1/2012 | Jung et al. | |
| 2003/0198179 A1 | 10/2003 | Koo et al. | |
| 2003/0228876 A1* | 12/2003 | Hwang | 455/522 |
| 2004/0018850 A1* | 1/2004 | Ishiguro | H04W 52/325 |
| | | | 455/522 |
| 2004/0132405 A1* | 7/2004 | Kitazawa | H04W 52/20 |
| | | | 455/13.4 |
| 2004/0190485 A1 | 9/2004 | Khan | |
| 2004/0223473 A1* | 11/2004 | Ha et al. | 370/335 |
| 2004/0240416 A1 | 12/2004 | Derryberry et al. | |
| 2004/0266466 A1 | 12/2004 | Kim et al. | |
| 2005/0107036 A1* | 5/2005 | Song et al. | 455/23 |
| 2005/0186983 A1 | 8/2005 | Iochi | |
| 2005/0288053 A1* | 12/2005 | Gu | 455/522 |
| 2006/0003787 A1 | 1/2006 | Heo et al. | |
| 2006/0146762 A1* | 7/2006 | Kuroda et al. | 370/335 |
| 2006/0153227 A1 | 7/2006 | Hwang et al. | |
| 2006/0215559 A1* | 9/2006 | Mese et al. | 370/232 |
| 2006/0252445 A1* | 11/2006 | Kim et al. | 455/522 |
| 2006/0281417 A1 | 12/2006 | Umesh et al. | |
| 2007/0002801 A1* | 1/2007 | Usuda | H04L 1/0025 |
| | | | 370/333 |
| 2007/0041349 A1 | 2/2007 | Kim et al. | |
| 2007/0066339 A1 | 3/2007 | Usuda et al. | |
| 2007/0149233 A1* | 6/2007 | Wang et al. | 455/522 |
| 2007/0155335 A1* | 7/2007 | Love et al. | 455/69 |
| 2007/0189230 A1 | 8/2007 | Lee | |
| 2007/0280370 A1 | 12/2007 | Liu | |
| 2008/0051028 A1 | 2/2008 | Jung et al. | |
| 2008/0062932 A1* | 3/2008 | Hwang | 370/331 |
| 2008/0119193 A1 | 5/2008 | Usuda et al. | |
| 2008/0161033 A1 | 7/2008 | Borran et al. | |
| 2008/0220805 A1 | 9/2008 | Dayal et al. | |
| 2008/0227477 A1 | 9/2008 | Dayal et al. | |
| 2008/0254819 A1 | 10/2008 | Niwano et al. | |
| 2008/0273454 A1 | 11/2008 | Malkamaki et al. | |

FOREIGN PATENT DOCUMENTS

| | | |
|---|---|---|
| EP | 1605605 | 12/2005 |
| EP | 1758275 | 2/2007 |
| JP | 2003318859 | 11/2003 |
| JP | 2006014304 | 1/2006 |
| KR | 1020040096748 | 11/2004 |
| KR | 1020060116738 | 11/2006 |
| WO | WO2005125048 | 12/2005 |
| WO | WO2006019265 | 2/2006 |
| WO | WO2006054721 | 5/2006 |

OTHER PUBLICATIONS

3rd Generation Partnership Project; Technical Specification Group Radio Access Network; FDD Enhanced Uplink; Overall Description; Stage 2 (Release 6).
3GPTT TS 25.309 V6.2.0, Mar. 2005.
Chinese Office Action dated Dec. 17, 2014 issued in counterpart application No. 200780035368.X.

* cited by examiner

METHOD AND APPARATUS FOR UPLINK POWER CONTROL IN COMMUNICATION SYSTEM

PRIORITY

This application is a Continuation Application of U.S. application Ser. No. 13/315,950 filed in the U.S. Patent and Trademark Office on Dec. 9, 2011, which is a Continuation Application of U.S. application Ser. No. 11/844,616 filed in the U.S. Patent and Trademark Office on Aug. 24, 2007, and claims priority under 35 U.S.C. §119(a) to a Korean Patent Application filed in the Korean Intellectual Property Office on Aug. 24, 2006 and assigned Serial No. 10-2006-0080799, the contents of each of which are incorporated herein by reference.

BACKGROUND OF THE INVENTION

1. Field of the Invention

The present invention relates to a method and system for uplink power control, and more particularly to a method and system for uplink power control when a Hybrid Automatic Repeat reQuest (HARQ) scheme is used in a communication system.

2. Description of the Related Art

In general, a base station and a subscriber station perform uplink power control in a cellular communication system in order to simultaneously maintain stable wireless link performance and minimize the effects of interference. For example, in an Institute of Electrical and Electronics Engineers (IEEE) 802.16e communication system, uplink power control is performed in such a manner as to maintain an uplink Carrier to Interference and Noise Ratio (CINR) to constantly hold an uplink target Packet Error Rate (PER). For example, when the uplink target PER is set to a lower value, the reliability of a wireless link increases, but an uplink CINR value required for maintaining the lower target PER also increases.

In contrast, when the uplink target PER is set to a higher value, the reliability of a wireless link decreases, but an uplink CINR value required for maintaining the higher target PER also decreases.

As a required uplink CINR value changes, the output of the subscriber station changes, so that the amount of uplink interference, capacity, and coverage area of the base station also changes. In other words, when a required uplink CINR value is great, the output of the subscriber station increases and the amount of uplink interference of the base station also increases, thereby decreasing the uplink coverage also and capacity of the base station.

In contrast, when a required uplink CINR value is small, the output of the subscriber station decreases and the amount of uplink interference of the base station also decreases, thereby increasing the uplink coverage area and capacity of the base station. Accordingly, the reliability of a wireless link secured by uplink power control has a trade-off relation with the uplink capacity and coverage of the base station.

In the IEEE 802.16e communication system, the HARQ scheme is employed in order to increase the reliability of a wireless link. When the HARQ scheme is employed, even if an error occurs in the transmission/reception of a packet, the packet can be normally transmitted/received by re-transmitting the packet in which an error has occurred. Therefore, when the HARQ scheme is employed, the uplink power control can be performed at a higher target PER, as compared with a case where the HARQ scheme is not employed.

When the uplink power control can be performed at a higher target PER, as described above, a required uplink CINR value decreases, thereby decreasing the transmission power of the subscriber station, so that it is possible to increase the coverage area and capacity of the base station.

In addition, although the subscriber station uses the same transmission power, the subscriber station can operate in a higher Modulation Product Coding (MPC) when using the HARQ scheme, thereby increasing an uplink data rate. In this case, a generated gain will be referred to as a "HARQ gain."

Although the HARQ scheme is employed in the IEEE 802.16e communication system, the HARQ scheme is not utilized with respect to management messages and part of data traffic. Data traffic for which the HARQ scheme is not used includes, for example, real-time data traffic, in which traffic for which the HARQ scheme is not used will be referred to as "non-HARQ traffic." Therefore, traffic of one subscriber station may include both HARQ traffic and non-HARQ traffic therein. In the IEEE 802.16e communication system, a base station uses a power control Information Element (IE) within an UpLink MAP (UL MAP) message in order to control the power of a subscriber station. The format of the power control IE is defined as shown in Table 1 below.

TABLE 1

| Syntex | size | Notes |
|---|---|---|
| UL-MAP_IE( ) | | |
| CID | 16 bit | |
|   UIUC | 4 bit | |
|   if(UIUC=15) | | |
|     Extended UIUC dependent IE | | |
|       Power Control IE | | |
|         Extended UIUC | 4 bits | Fast power control = 0x00 |
|         Length | 4 bits | Lenth = 0x01 |
|         Power Control | 8 bits | Signed integer which expresses the change in power level (in 0.25 dB units) that the SS should apply to correct its current transmission power |

As shown in Table 1, the power control IE is contained in an UP MAP message, so that the power control IE is identified only by a basic connection identifier (CID) contained in the UL MAP message.

In order to increase a HARQ gain in the IEEE 802.16e communication system, it is necessary to use a high target PER of about 10 to 30%. However, when the HARQ scheme is not used, it is impossible to recover an error occurring in a wireless link. Therefore, the uplink power control for non-HARQ traffic is performed at a low target PER of less than 1% in order to ensure the reliability of the wireless uplink in the IEEE 802.16e communication system. As a result, a target-PER mismatch phenomenon between HARQ traffic and non-HARQ traffic occurs. The reliability of non-HARQ traffic cannot be guaranteed if a target PER suitable to HARQ traffic is applied, while a HARQ gain cannot be guaranteed if a target PER suitable to non-HARQ traffic is applied.

However, in the IEEE 802.16e communication system, the uplink power control is performed without taking into consideration whether the HARQ scheme is used, as described with reference to Table 1. Therefore, there is an earnest need for a way to control uplink power by considering both of a case where the HARQ scheme is used and a case where the HARQ scheme is not used.

SUMMARY OF THE INVENTION

Accordingly, the present invention has been made to solve the above-mentioned problems occurring in the prior art, and the present invention provides a method and system for uplink power control in a communication system.

In addition, the present invention provides a method and system which performs an uplink power control according to whether or not the HARQ scheme is used in a communication system.

In accordance with an aspect of the present invention, there is provided a method for uplink power control by a base station in a communication system, the method includes determining a power control offset for controlling power for traffic to be transmitted by a subscriber station, according to whether a Hybrid Automatic Repeat reQuest (HARQ) is applied to the traffic; and transmitting the power control offset to the subscriber station.

In accordance with another aspect of the present invention, there is provided a method for uplink power control by a subscriber station in a communication system, the method includes receiving an Uplink Channel Descriptor (UCD) message from a base station, the UCD message containing a power control offset for controlling transmission power of traffic according to whether Hybrid Automatic Repeat reQuest (HARQ) is applied; and setting uplink transmission power for HARQ traffic, to which the HARQ is applied, to a level less than an uplink transmission power for non-HARQ traffic, to which the HARQ is not applied, by means of the power control offset.

In accordance with still another aspect of the present invention, there is provided a base station for controlling uplink power in a communication system, which determines a power control offset for controlling power for traffic to be transmitted by a subscriber station according to whether Hybrid Automatic Repeat reQuest (HARQ) is applied to the traffic; and transmits the power control offset to the subscriber station.

In accordance with still another aspect of the present invention, there is provided a subscriber station for controlling uplink power in a communication system, which receives, from a base station, an Uplink Channel Descriptor (UCD) message which contains a power control offset for controlling transmission power of traffic according to whether Hybrid Automatic Repeat reQuest (HARQ) is applied; and sets uplink transmission power for HARQ traffic, to which the HARQ is applied, to a level less than an uplink transmission power for non-HARQ traffic, to which the HARQ is not applied, by means of the power control offset.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Figure 1:
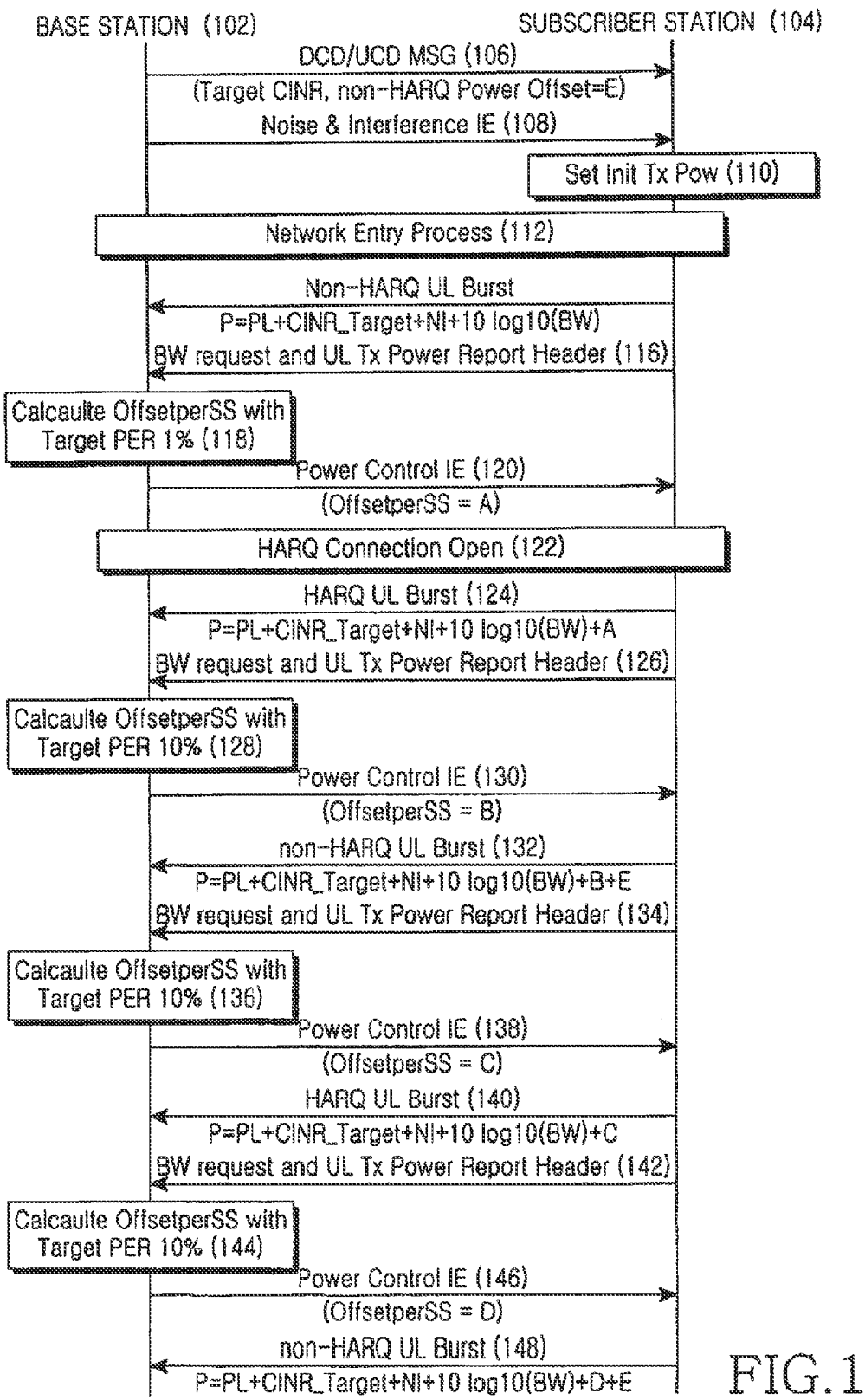
FIG. 1 is a flowchart illustrating an uplink power control procedure according to a first embodiment of the present invention.

Hereinafter, exemplary embodiments of the present invention will be described with reference to the accompanying drawings. It is to be noted that the same elements are indicated with the same reference numerals throughout the drawings. In the following description, a detailed description of known functions and configurations incorporated herein will be omitted when it may obscure the subject matter of the present invention. Terms described in the following description are defined by taking functions thereof into consideration, so they may vary according to users, operator's intention, or custom. Accordingly, the terms must be defined based on the entire contents of the present application.

The present invention provides a method and system which performs an uplink power control according to whether a Hybrid Automatic Repeat reQuest (HARQ) scheme is used in a communication system, for example, in an Institute of Electrical and Electronics Engineers (IEEE) 802.16e communication system. In the following description, "HARQ traffic" represents traffic for which the HARQ scheme is used, and "non-HARQ traffic" represents traffic for which the HARQ scheme is not used. The non-HARQ traffic may include a management message, and part of the traffic, such as real-time traffic data.

The uplink power control according to the present invention is implemented in such a manner as to control power for HARQ traffic and non-HARQ traffic, in which first and second embodiments are proposed.

According to the first embodiment of the present invention, in order to perform separate power control for the HARQ traffic and non-HARQ traffic, a predetermined power control offset value is inserted into an Uplink Channel Descriptor (UCD) message transmitted/received between a base station and a subscriber station, and the power control offset value is used to control the power of the base station and subscriber station.

In detail, the first embodiment may be implemented according to the following two subembodiments. According to the first subembodiment, a non-HARQ power control offset value based on a target packet error rate (PER) for HARQ traffic is applied to non-HARQ traffic upon controlling uplink power. The non-HARQ power control offset value is defined in the format of TLV (Type, Length and Value), as shown in Table 2 below.

TABLE 2

| Name | Type (1 Byte) | Length | Value |
| --- | --- | --- | --- |
| Relative power offset for UL non-HARQ burst | TBD | 1 | Offset for non-HARQ burst relative to HARQ burst (Unsigned in 0.25 dB unit) |

The non-HARQ power control offset is represented by one byte, as shown in Table 2, and a "Relative power offset for UL non-HARQ burst" of the TLV format shown in Table 2 is contained in an uplink channel descriptor (UCD) message.

In addition, according to the second subembodiment, a HARQ power control offset based on a target PER for non-HARQ traffic is applied to HARQ traffic. The HARQ power control offset value is defined in the format of TLV as shown in Table 3 below.

TABLE 3

| Name | Type (1 Byte) | Length | Value |
|---|---|---|---|
| Relative power offset for UL HARQ burst | TBD | 1 | Offset for HARQ burst relative to non-HARQ burst (Signed in 0.25 dB unit) |

The HARQ power control offset is represented by one byte, as shown in Table 3, and a "Relative power offset for UL HARQ burst" of the TLV format shown in Table 2 is contained in a UCD message. When the subscriber station receives information of the Relative power offset for UL HARQ burst, the subscriber station adds the Relative power offset to a target CINR of the non-HARQ burst, wherein the target CINR is also contained in the UCD message, or the target CINR is able to be obtained by other control message from the base station.

In the following description, the uplink power control using the first embodiment will be explained based on the first subembodiment.

First, when a subscriber station does not support a HARQ mode operation and operates only in a non-HARQ mode, the subscriber station performs an uplink power control according to the existing uplink power control scheme generally used in the IEEE 802.16e communication system, regardless of the HARQ or non-HARQ power control offset value, and a base station also performs an uplink power control by means of an existing target PER value for non-HARQ power control.

In contrast, when a subscriber station supports a HARQ operation, and HARQ traffic and non-HARQ traffic exist together, a power control offset value according to the present invention is reflected in the uplink power control. That is, a base station performs an uplink power control by using a target PER greater than a target PER for non-HARQ traffic, so as to increase a HARQ gain. Thereafter, when transmitting HARQ traffic, the subscriber station determines transmission power in the same manner as the existing uplink power control scheme. In contrast, when transmitting non-HARQ traffic, the subscriber station performs a control operation in such a manner as to amplify transmission power determined by the existing uplink power control scheme to as high as a non-HARQ power control offset value as shown in Table 2 with respect to the non-HARQ traffic to be transmitted.

In this case, a time point at which the non-HARQ power control offset value is applied is as follows. From when a HARQ connection is opened, the base station changes an outer loop target PER, for example, from a non-HARQ target PER of less than 1% to a HARQ PER of 10 to 30%, with respect to HARQ traffic. Thereafter, the subscriber station transmits uplink non-HARQ traffic using transmission power to which the non-HARQ power control offset.

The non-HARQ power control offset value may be determined by the difference between target PERs required for HARQ traffic and non-HARQ traffic. If the difference between target PERs required for HARQ traffic and non-HARQ traffic is large, i.e. greater than a threshold, the difference between required uplink Carrier to Interference and Noise Ratios (CINRs) also becomes large, so that the non-HARQ power control offset value is set to a large value, as well. In contrast, if the difference between target PERs required for HARQ traffic and non-HARQ traffic is small, i.e. less than a threshold, the difference between required uplink CINRs also becomes small, so that the non-HARQ power control offset value is set to a small value, as well.

FIG. 1 is a flowchart illustrating an uplink power control procedure according to the first embodiment of the present invention.

In step 106, a base station 102 transmits a UCD message, which contains a non-HARQ power control offset value "E" and a target CINR, to a subscriber station 104. The E may be determined by the difference between target PERs required for HARQ traffic and non-HARQ traffic. If the difference between target PERs required for HARQ traffic and non-HARQ traffic is large, the difference between required uplink CINRs also becomes large, so that the E is set to a large value, as well. In contrast, if the difference between target PERs required for HARQ traffic and non-HARQ traffic is small, the difference between required uplink CINRs also becomes small, so that the E is set to a small value, as well.

Then, the base station 102 transmits a noise and interference IE to the subscriber station 104 in step 108, and the subscriber station 104 sets initial transmission power in step 110. The initial transmission power, which is a value calculated based on the same target PER without distinguishing between HARQ traffic and non-HARQ traffic in the existing IEEE 802.16e communication system, is calculated as Equation (1), and then step 112 is performed.

$$P(dbm)=PL(dB)+CINR\ Target(dB)+NI(dBm)+10\ log\ 10(BW) \quad (1)$$

In Equation (1), the "PL" represents an uplink path loss, "NI" represents a noise and interference PSD, and "BW" represents an allocated bandwidth.

In step 112, a network entry process is performed between the base station 102 and the subscriber station 104, and then step 114 is performed.

In step 114, the subscriber station 104 transmits power for a non-HARQ uplink burst, which is calculated by Equation (1), to the base station 102, and then proceeds to step 116. In this case, the power for the non-HARQ uplink burst is the same as that obtained by the existing scheme.

In step 116, the subscriber station 104 transmits a bandwidth request and uplink transmission power report header message to the base station 102. Then, the base station 102 calculates a power offset "A" of the subscriber station 104 with a non-HARQ target PER of less than 1% in step 118, and then proceeds to step 120. The power offset "A" is a value for amplifying or deceasing transmission power according to channel states. The power offset "A" is calculated in a method different from the method of calculating the power offset "E" defined in the present invention, and has no direct relation to the present invention, so a detailed description thereof will be omitted.

The base station 102 transmits a power control IE containing the calculated power offset "A" to the subscriber station 104 in step 120, and then a HARQ connection between the base station 102 and the subscriber station 104 is opened in step 122. Then, the subscriber station 104 transmits a HARQ uplink burst to the base station 102 after determining the power for the HARQ uplink burst of step 124, and proceeds to step 126. In this case, the power for the non-HARQ burst is calculated by Equation (2), which is obtained by adding the power offset "A" to Equation (1). In other words, the subscriber station adds the power offset to the target CINR of the non-HARQ burst, wherein the target CINR is obtained by receiving information of the target CINR in the UCD message from the base station.

$$P(dbm)=PL(dB)+CINR\ Target(dB)+NI(dBm)+10\log 10(BW)+A \quad (2)$$

When the subscriber station 104 transmits a bandwidth request and uplink transmission power report header message to the base station 102 in step 126, the base station 102 calculates a power offset "B" of the subscriber station 104 with a non-HARQ target PER of less than 10% in step 128. In this case, the power offset "B" also is different from the non-HARQ power control offset "E" defined in the present invention, and has no direct relation to the present invention, so a detailed description thereof will be omitted.

The base station 102 transmits a power control IE containing the calculated power offset "B" to the subscriber station 104 in step 130, and then the subscriber station 104 transmits a non-HARQ uplink burst to the base station 102 after determining the power for the non-HARQ uplink burst of step 132. In this case, since the HARQ connection is in an open state, the non-HARQ power control offset "E" according to the present invention is taken into consideration. That is, the power for the non-HARQ burst is calculated by Equation (3), which is obtained by adding the power offset "B" and the E to Equation (1).

$$P(dbm)=PL(dB)+CINR\ Target(dB)+NI(dBm)+10\log 10(BW)+B+E \quad (3)$$

When the subscriber station 104 transmits a bandwidth request and uplink transmission power report header message to the base station 102 in step 134, the base station 102 calculates a power offset "C" of the subscriber station 104 with a non-HARQ target PER of less than 10% in step 136.

The base station 102 transmits a power control IE containing the calculated power offset "C" to the subscriber station 104 in step 138, and then the subscriber station 104 transmits a HARQ uplink burst to the base station 102 after determining the power for the HARQ uplink burst of step 140. In this case, the power for the HARQ burst is calculated by Equation (4), which is obtained by adding the power offset "C" to Equation (1). The power offset "C" also is different from the non-HARQ power control offset "E" defined in the present invention, and has no direct relation to the present invention, so a detailed description thereof will be omitted.

$$P(dbm)=PL(dB)+CINR\ Target(dB)+NI(dBm)+10\log 10(BW)+C \quad (4)$$

When the subscriber station 104 transmits a bandwidth request and uplink transmission power report header message to the base station 102 in step 142, the base station 102 calculates a power offset "D" of the subscriber station 104 with a non-HARQ target PER of less than 10% in step 144.

The base station 102 transmits a power control IE containing the calculated power offset "D" to the subscriber station 104 in step 146, and then the subscriber station 104 transmits a HARQ uplink burst to the base station 102 after determining the power for the HARQ uplink burst of step 148. In this case, the power offset "D" also is different from the non-HARQ power control offset "E" defined in the present invention, and has no direct relation to the present invention, so a detailed description thereof will be omitted.

The power for the non-HARQ burst is calculated by Equation (5), which is obtained by adding the E and the D to Equation (1).

$$P(dbm)=PL(dB)+CINR\ Target(dB)+NI(dBm)+10\log 10(BW)+D+E \quad (5)$$

As described above, the base station 102 sets initial transmission power based on Equation (1), without distinguishing between HARQ and non-HARQ traffic. Thereafter, when a HARQ connection is opened, the base station 102 calculates power for HARQ traffic, by adding a power control value, which is calculated according to channel states, to the initial transmission power value obtained by Equation (1). In contrast, with respect to non-HARQ traffic, the base station 102 calculates power therefor, by adding a power control value, which is calculated according to channel states, and a non-HARQ power control offset to the initial transmission power value, thereby providing a lower uplink error rate through amplified transmission power than that provided by the conventional method.

Figure 2:
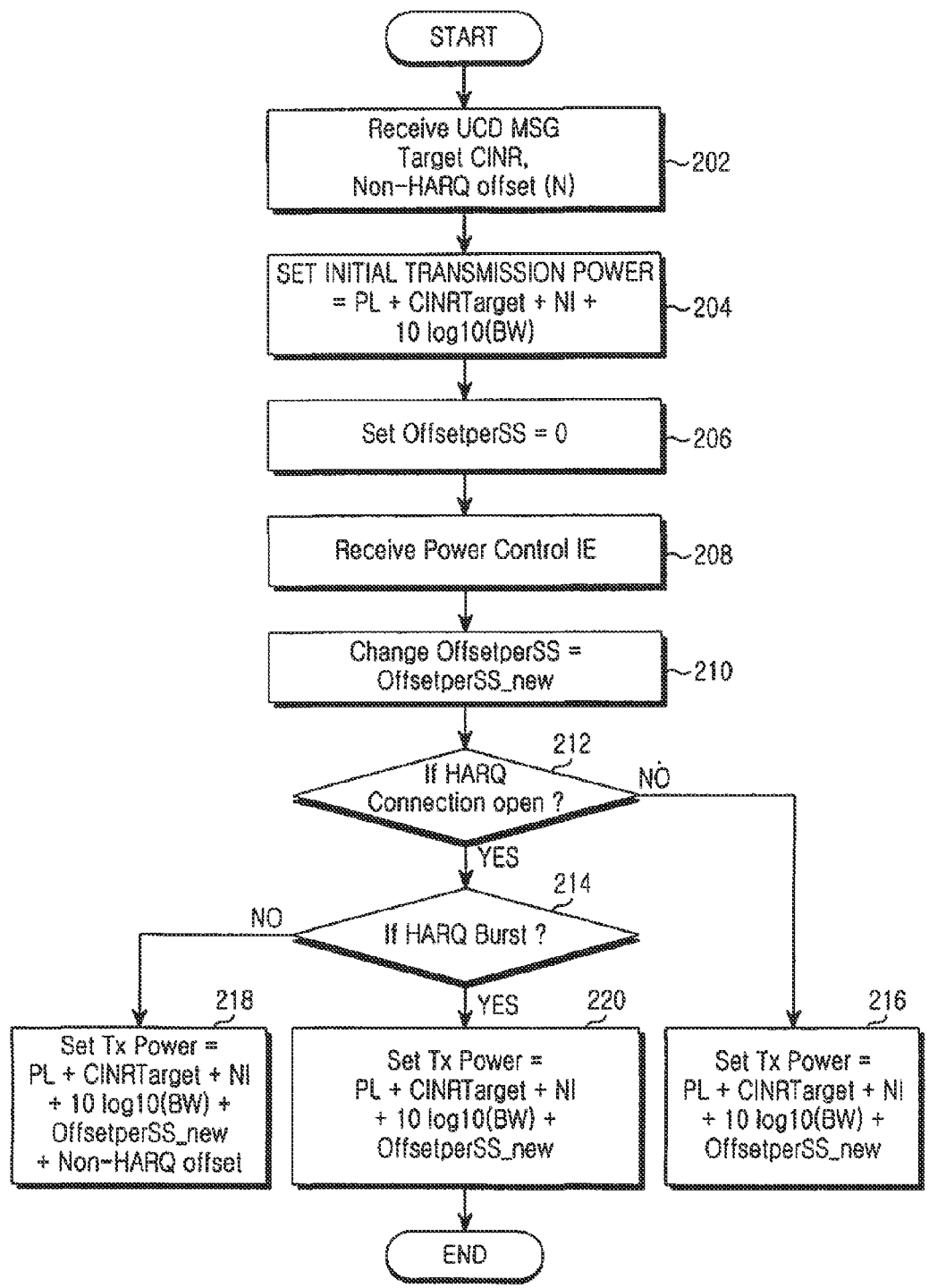
FIG. 2 is a flowchart illustrating the operation of the subscriber station which performs power control according to the first embodiment of the present invention.

FIG. 2 is a flowchart illustrating the operation of the subscriber station which performs power control according to the first scheme of the present invention.

When the subscriber station 104 receives a UCD message which contains a target CINR and a non-HARQ power control offset "E" from the base station in step 202, the subscriber station 104 sets initial transmission power based on Equation (1) in step 204, and proceeds to step 206.

Then, the subscriber station 104 sets its own power control offset (Offset per SS) to zero in step 206, and receives a power control IE from the base station in step 208. The power control IE contains a power offset (Offset per SS_new) for amplifying or attenuating the transmission power according to the channel states. Thereafter, the subscriber station 104 replaces the "Offset per SS," which has been set to zero, with the "Offset per SS_new" received through the power control IE in step 210, and determines if a HARQ connection has been opened in step 212.

When it is determined that the HARQ connection has not been opened, the subscriber station 104 proceeds to step 216. In step 216, the subscriber station 104 sets transmission power to a value obtained by adding the "Offset per SS_new" received in step 210 to Equation (1).

In contrast, when it is determined that the HARQ connection has been opened, the subscriber station 104 determines if there is a HARQ burst in step 214. When it is determined that there is a HARQ burst, the subscriber station 104 sets transmission power to a value obtained by adding the "Offset per SS_new" received in step 210 to Equation (1) in step 220. When it is determined that there is no HARQ burst, the subscriber station 104 amplifies and sets transmission power to a value obtained by adding the E received in step 202 to a set transmission power value in step 218.

As described above, while operating in the HARQ mode, the subscriber station according to the first subembodiment of the present invention amplifies the power for a non-HARQ burst to as high as a non-HARQ power control offset value "E" before transmitting the non-HARQ burst. Accordingly, uplink errors do not increase, even with respect to non-HARQ bursts. Similarly, a subscriber station according to the second embodiment of the present invention decreases the power for a HARQ burst to as low as a HARQ power control offset value based on a target PER for non-HARQ traffic before transmitting the HARQ burst, while operating in the HARQ mode.

Hereinafter, the second embodiment of the present invention will be described.

According to the current 802.16e system standard, a subscriber station notifies a base station of power control feedback information by means of a power control IE. That is, the power control IE is configured to report corresponding information by means of only a basic CID. Therefore, when a subscriber station has two or more pieces of traffic having different target PERs, the subscriber station can receive only power control information for any one piece of traffic, which is harmful to other pieces of traffic. For this reason, according to the present invention, a primary CID, in addition to the basic CID, is included in the CID field of the power control IE in the 802.16e system so that each CID can carry different types of traffic power control information. In detail, the basic CID is defined as an identifier which reports power control feedback information for non-HARQ traffic, and the primary CID is defined as an identifier which reports power control feedback information for HARQ traffic. A subscriber station uses the CID field as power control feedback information to which the subscriber station makes reference upon unlink transmission of a burst of corresponding traffic.

Figure 3:
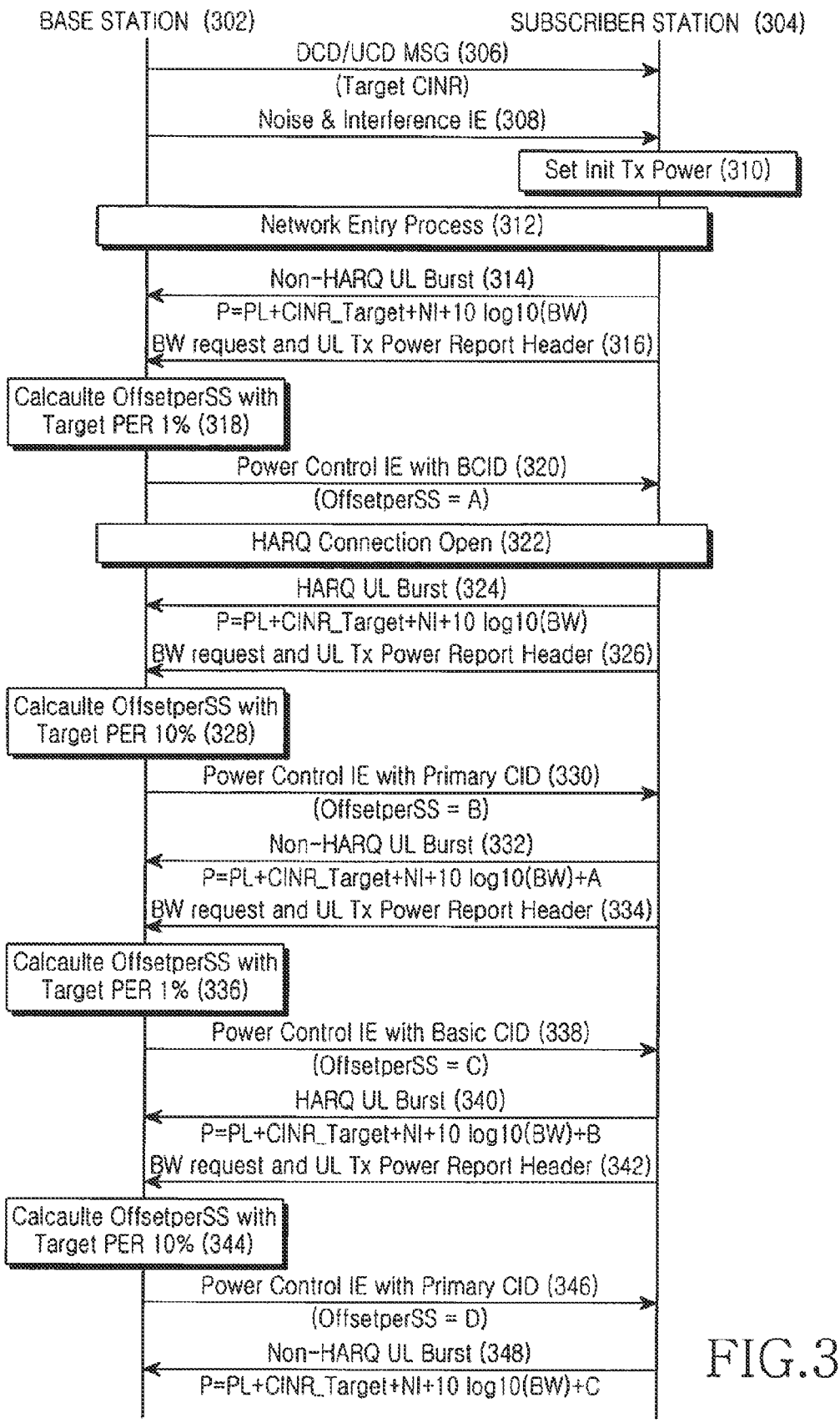
FIG. 3 is a flowchart illustrating a power control procedure according to a second embodiment of the present invention.

FIG. 3 is a flowchart illustrating a power control procedure according to the second embodiment of the present invention.

In step 306, a base station 302 transmits a UCD message containing a target CINR to the subscriber station 304, and proceeds to step 308.

When the base station 302 transmits a noise and interference information IE to the subscriber station 304 in step 308, the subscriber station 304 sets initial transmission power in step 310. The initial transmission power, which is a value calculated based on the same target PER without distinguishing between HARQ traffic and non-HARQ traffic by the existing technology, is calculated as Equation (1).

Thereafter, in step 312, a network entry process is performed between the base station 302 and the subscriber station 304.

In step 314, the subscriber station 304 transmits power for a non-HARQ uplink burst, which is calculated by Equation (1), to the base station 302, and then proceeds to step 316. In this case, the power for the non-HARQ uplink burst is the same as that obtained by the existing scheme.

When the subscriber station 304 transmits a bandwidth request and uplink transmission power report header message to the base station 302 in step 316, the base station 302 calculates a power offset "A" of the subscriber station 304 with a non-HARQ target PER of less than 1% in step 318. The power offset "A" is a value for amplifying or deceasing transmission power according to the channel states. The method for calculating the power offset "A" has no direct relation to the present invention, so a detailed description thereof will be omitted.

In step 320, the base station 302 transmits a power control IE to the subscriber station 304, and proceeds to step 322. In this case, the power control IE contains the calculated "A" and a basic CID representing target PER information for non-HARQ traffic.

In step 322, a HARQ connection between the base station 302 and the subscriber station 304 is opened. Then, since the subscriber station 304 does not receive power control information for a HARQ uplink burst, the subscriber station 304 transmits in step 324 the HARQ uplink burst to the base station 302 after setting transmission power for the HARQ uplink burst to the initial transmission power determined in step 310.

When the subscriber station 304 transmits a bandwidth request and uplink transmission power report header message to the base station 302 in step 326, the base station 302 calculates a power offset "B" of the subscriber station 304 with a HARQ target PER of less than 10% in step 328, and then transmits a power control IE containing the calculated power offset "B" to the subscriber station 304 in step 330. The method for calculating the power offset "B" also has no direct relation to the present invention, so a detailed description thereof will be omitted.

In step 332, the subscriber station 304 transmits a non-HARQ uplink burst to the base station 302 after determining power for the non-HARQ uplink burst. In this case, since the HARQ connection is in an open state, power control information "A" of the received basic CID according to the present invention is taken into consideration. That is, the power for the HARQ burst is calculated by Equation (2), which is obtained by adding the "A" to Equation (1).

In step 334, the subscriber station 304 transmits a bandwidth request and uplink transmission power report header message to the base station 302. Then, the base station 302 calculates a power offset "C" of the subscriber station 104 with a non-HARQ target PER of less than 1% in step 336. Then, the base station 302 transmits a power control IE containing the calculated "C" and basic CID to the subscriber station 304 in step 338. The method for calculating the power offset "C" also has no direct relation to the present invention, so a detailed description thereof will be omitted.

In step 340, the subscriber station 304 transmits a HARQ uplink burst to the base station 302 after determining power for the HARQ uplink burst. The power for the HARQ uplink burst is determined by taking into consideration the power control information "B" of the received primary CID. That is, the power for the HARQ uplink burst is calculated by Equation (3), which is obtained by adding the "B" to Equation (1).

When the subscriber station 304 transmits a bandwidth request and uplink transmission power report header message to the base station 302 in step 342, the base station 302 calculates a power offset "D" of the subscriber station 304 with a non-HARQ target PER of less than 10% in step 344. The method for calculating the power offset "D" also has no direct relation to the present invention, so a detailed description thereof will be omitted. In step 346, the base station 302 transmits a power control IE containing the calculated "D" to the subscriber station 304, and proceeds to step 348.

In step 348, the subscriber station 304 transmits a non-HARQ uplink burst to the base station 302 after determining power for the non-HARQ uplink burst. In this case, the power for the non-HARQ burst is calculated by Equation 4, which is obtained by adding the "C," contained in the basic CID received in step 338, to Equation (1).

As described above, according to the second embodiment of the present invention, the base station 302 performs power control for HARQ traffic and non-HARQ traffic by means of mutually different target PERs, in which power control values are transmitted to the subscriber station through power control IEs containing different CIDs (e.g., a basic CID and a primary CID).

Figure 4:
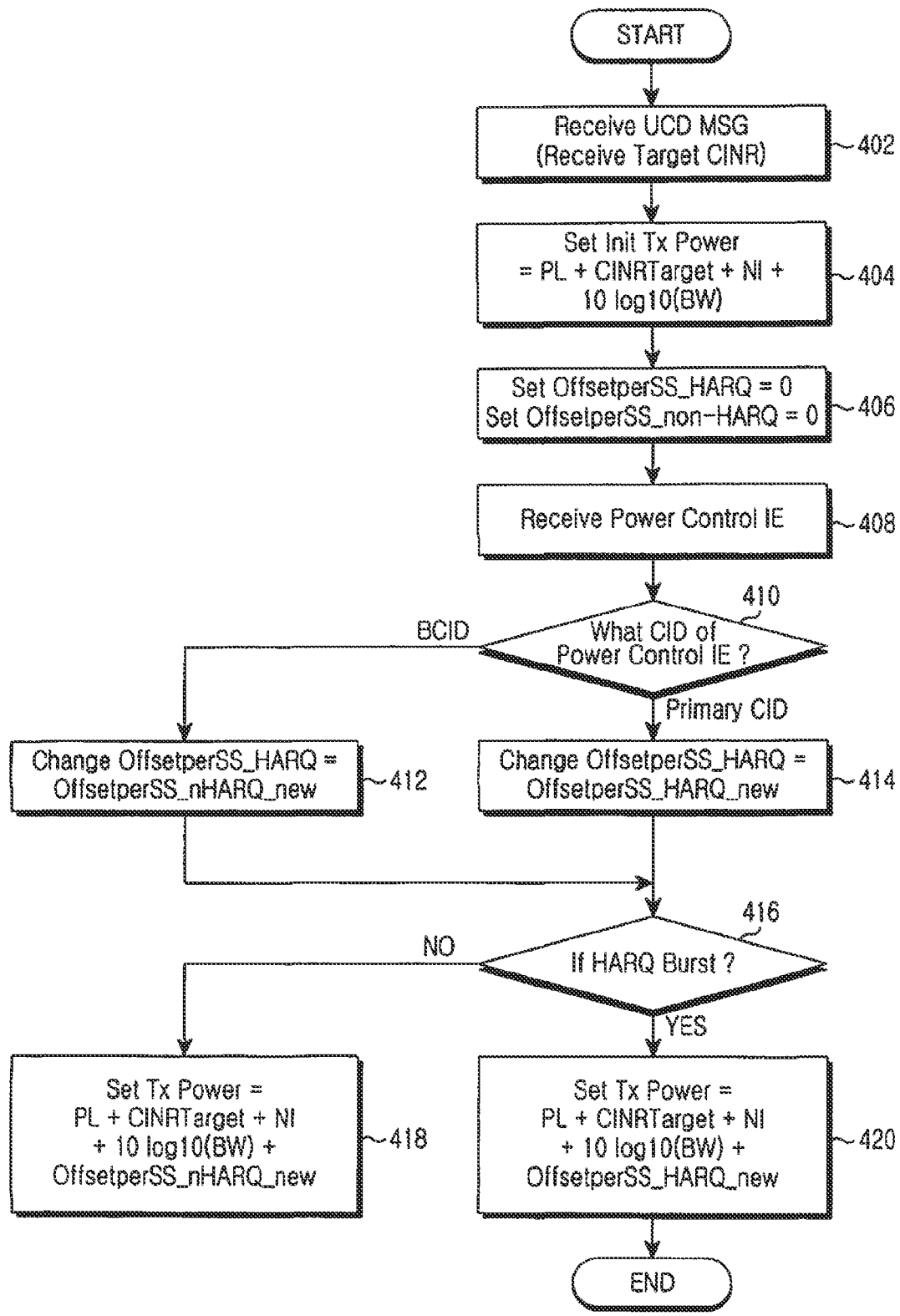
FIG. 4 is a flowchart illustrating the operation of a subscriber station which performs power control according to the second embodiment of the present invention.

FIG. 4 is a flowchart illustrating the operation of a subscriber station which performs power control according to the second embodiment of the present invention.

When the subscriber station 304 receives a UCD message containing a target CINR in step 402, the subscriber station 304 sets initial transmission power based on Equation 1 in step 404.

In step 406, the subscriber station 304 sets both a HARQ power control offset value (Offset per SS_HARQ) and a non-HARQ power control offset value (Offset per SS_non- HARQ) to zero. Thereafter, the subscriber station 304 receives a power control IE from the base station in step 408, and proceeds to step 410. In this case, the power control IE contains a primary CID and a basic CID, which indicate power control feedback information according to types of traffic. That is, after the base station performs power control for HARQ traffic and non-HARQ traffic by means of the respective corresponding target PER, the base station transmits the respective power control information to the subscriber station 304 through the CIDs. In detail, the primary CID indicates power control information "Offset per SS_HARQ_new" for HARQ traffic, and the basic CID indicates power control information "Offset per SS_nHARQ_new" for non-HARQ traffic.

In step 410, the subscriber station 304 determines whether the CID received through the power control IE corresponds to a basic CID or a primary CID. When it is determined that the received CID corresponds to a basic CID, the subscriber station 304 replaces the "Offset per SS" set to zero by the "Offset per SS_nHARQ_new" received through the power control IE in step 412, and proceeds to step 416.

In contrast, when it is determined that the received CID corresponds to a primary CID, the subscriber station 304 replaces the "Offset per SS" set to zero by the "Offset per SS_HARQ_new" received through the power control IE in step 414, and proceeds to step 416.

In step 416, the subscriber station 304 determines if there is a HARQ burst. When it is determined that there is no HARQ burst, the subscriber station 304 sets transmission power to a value obtained by adding the "Offset per SS_n-HARQ_new" set in step 412 to Equation (1).

In contrast, when it is determined that there is a HARQ burst, the subscriber station 304 sets transmission power to a value obtained by adding the "Offset per SS_HARQ_new" received in step 414 to Equation (1) in step 420.

As described above, the subscriber station according to the second embodiment of the present invention makes reference to a CID of a power control IE received from the base station, and performs separate power control for HARQ traffic and non-HARQ traffic while distinguishing between the HARQ traffic and non-HARQ traffic based on the CID.

Effects of the present invention, especially the effects obtained by the above-mentioned embodiments, will now be described.

The present invention intends to solve a target-PER mismatch problem between the target PERs of HARQ traffic and non-HARQ traffic, which may occur upon uplink power control when the HARQ is applied. According to the present invention, although the same target PER is applied to HARQ traffic and non-HARQ traffic, the subscriber station transmits uplink data with different levels of transmission power for the HARQ traffic and non-HARQ traffic. Accordingly, the present invention can increase a HARQ gain by applying a higher target PER to HARQ traffic, while increasing the reliability of wireless link by using a relatively higher level of transmission power for non-HARQ traffic as compared with that used for the HARQ traffic.

In detail, according to the first embodiment of the present invention, since the power control for non-HARQ traffic is performed by using a fixed offset value, the present invention can be implemented without a large change to the existing 802.16e system, while minimizing increments of additional signaling overhead.

In addition, according to the second embodiment of the present invention, the power control for HARQ traffic and the power control for non-HARQ traffic are separately performed, so that it is possible to achieve more precise power control as compared with the first scheme, even though there may be signaling overhead.

While the present invention has been shown and described with reference to certain exemplary embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for controlling a transmission power at a user equipment (UE) in a wireless communication system, the method comprising:
   receiving, from a Base Station (BS), a message comprising a power offset for a hybrid automatic repeat request (HARQ) burst relative to a non-HARQ burst;
   transmitting, to the BS, the non-HARQ burst, and
   transmitting, to the BS, the HARQ burst by controlling a transmission power of the HARQ burst using the power offset,
   wherein controlling the transmission power of the HARQ burst includes adjusting a carrier to noise ratio value for the HARQ burst referencing to the non-HARQ burst.

2. The method of claim 1, wherein controlling the transmission power of the HARQ burst includes adding the power offset to a carrier to noise ratio value of the non-HARQ burst.

3. The method of claim 1, wherein the power offset is included in uplink control information broadcasted from the BS.

4. The method of claim 1, wherein a value of the power offset is determined corresponding to size of a carrier to noise ratio value required for the transmission power.

5. The method of claim 1, wherein a power control Information Element for each of the non-HARQ burst and the HARQ burst, broadcasted from the BS, includes a different connection identifier (CID) according to a burst type.

6. A method for controlling a transmission power of a user equipment (UE) at a base station (BS) in a wireless communication system, the method comprising:
   determining a power offset to control a transmission power of a hybrid automatic repeat reguest (HARQ) burst for a user equipment (UE) relative to a non-HARQ burst; and
   transmitting a message comprising the power offset to a UE,
   wherein the transmission power of the HARQ burst is controlled by adjusting a carrier to noise ratio value for the HARQ burst referencing to the non-HARQ burst at the UE.

7. The method of claim 6, wherein the power offset is added to a carrier to noise ratio value of the non-HARQ burst.

8. The method of claim 6, wherein the power offset is included in uplink control information broadcasted by the BS.

9. The method of claim 6, wherein a value of the power offset is determined corresponding to size of a carrier to noise ratio value required for the transmission power of the HARQ burst.

10. The method of claim 6, further comprising:
    broadcasting a power control Information Element for each of the non-HARQ burst and the HARQ burst including a different connection identifier (CID) according to a burst type.

11. A user equipment (UE) for controlling a transmission power in a wireless communication system, the UE comprising:
- a receiver for receiving a message comprising a power offset for a hybrid automatic repeat request (HARQ) burst relative to a non-HARQ burst from a Base Station (BS);
- a controller for controlling a transmitter transmitting the HARQ burst by controlling a transmission power of the HARQ burst using the power offset; and
- the transmitter for transmitting the HARQ burst and the non-HARQ burst by controlling of the controller,
- wherein the controller adjusts a carrier to noise ratio value for the HARQ burst referencing to the non-HARQ burst for controlling the transmission power.

12. The UE of claim 11, wherein the controller adds the power offset to a carrier to noise ratio value of the non-HARQ burst for controlling the transmission power.

13. The UE of claim 11, wherein the power offset is included in an uplink control information broadcasted from the BS.

14. The UE of claim 11, wherein a value of the power offset is determined corresponding to size of a carrier to noise ratio value required for the transmission power.

15. The UE of claim 11, wherein a power control Information Element for each of the non-HARQ burst and the HARQ burst, broadcasted from the BS, includes a different connection identifier (CID) according to a burst type.

16. A base station (BS) for controlling a transmission power of a user equipment (UE) in a wireless communication system, the BS comprising:
- a controller for determining a power offset to control a transmission power of a hybrid automatic repeat request (HARQ) burst for a user equipment (UE) relative to a non-HARQ burst; and
- a transmitter for transmitting a message comprising the power offset to the UE,
- wherein the transmission power of the HARQ burst is controlled by adjusting a carrier to noise ratio value for the HARQ burst referencing to the non-HARQ burst at the UE.

17. The BS of claim 16, wherein the controller adds the power offset to a carrier to noise ratio value of the non-HARQ burst.

18. The BS of claim 16, wherein the power offset is included in uplink control information broadcasted by the BS.

19. The BS of claim 16, wherein a value of the power offset is determined corresponding to size of a carrier to noise ratio value required for the transmission power.

20. The BS of claim 16, wherein a power control Information Element for each of the non-HARQ burst and the HARQ burst includes a different connection identifier (CID) according to a burst type.

* * * * *